May 1, 1951　　　　　C. W. BERTHIEZ　　　　2,551,237
DEVICE FOR LOCKING MACHINE SLIDES

Filed April 11, 1945　　　　　　　　　　2 Sheets-Sheet 1

Charles William Berthiez
INVENTOR
By George H. Corey
His Attorney

May 1, 1951  C. W. BERTHIEZ  2,551,237
DEVICE FOR LOCKING MACHINE SLIDES
Filed April 11, 1945  2 Sheets-Sheet 2
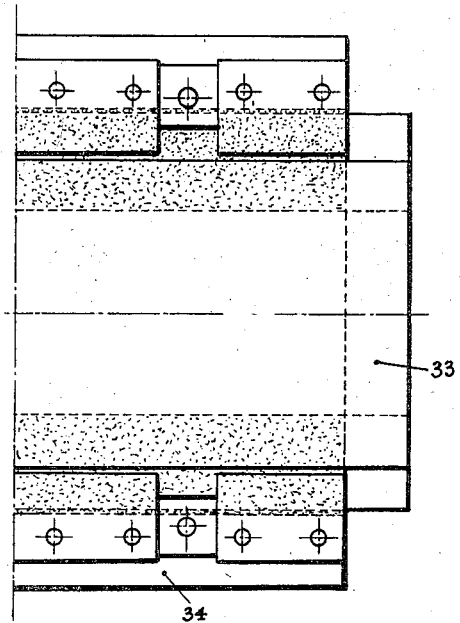
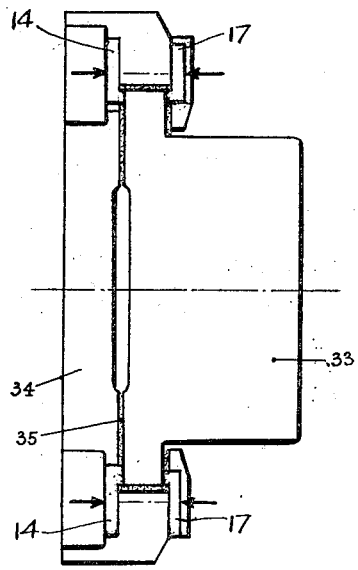
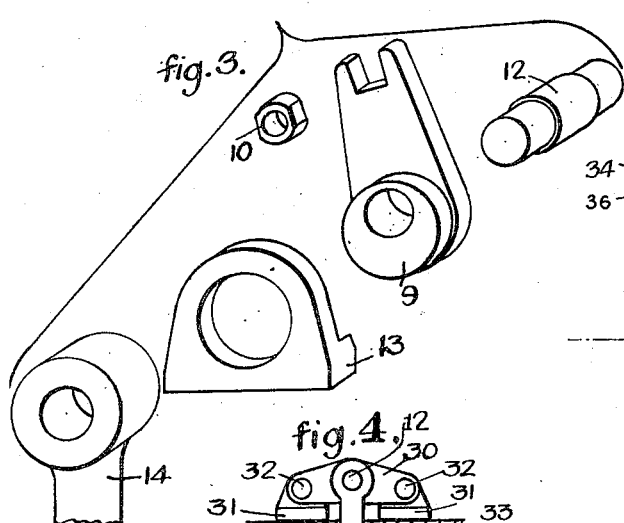
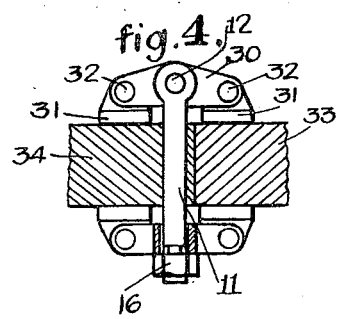
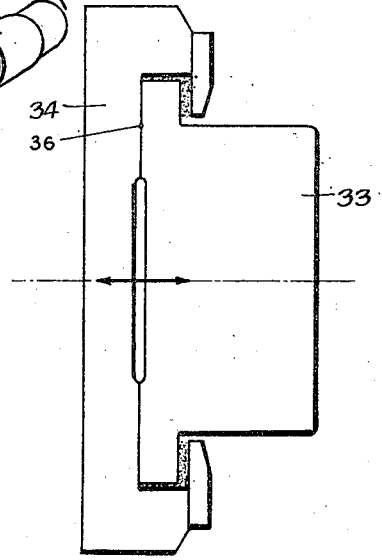
Charles William Berthiez
INVENTOR
BY George H. Corey
His Attorney Patented May 1, 1951

2,551,237

UNITED STATES PATENT OFFICE 2,551,237

DEVICE FOR LOCKING MACHINE SLIDES

Charles William Berthiez, Paris, France

Application April 11, 1945, Serial No. 587,777
In France December 16, 1943

Section 1, Public Law 690, August 8, 1946
Patent expires December 16, 1963

6 Claims. (Cl. 29—1)

This invention has reference to the locking and unlocking of slides of machines, particularly of machine tools.

It is known that in devices for that purpose proposed heretofore, the locking action is effected by creating a pressure between the slide and its carrier, usually a metal surface of the slide bearing against another metal surface of the carrier, to produce a considerable frictional reaction. However this manner of effecting the locking action presents the following disadvantages:

(a) Lubrication, particularly where it is effected by delivering oil under pressure between the slides and contacting surfaces, is entirely stopped between tightly contacting surfaces, as the protective oil film is broken. As a result of this, when the machine is restarted, a waste of time is involved for enabling re-establishment of the oil film to take place or, alternatively, the machine starts running without being lubricated, this obviously damaging the slides by undue attrition.

(b) The position of the slide when locked is different from its position in unlocked condition because clearance of the slide, that is, at the contacting surfaces, is brought down to zero, so that the position of any tool mounted on the slide carriage is necessarily, after locking has been effected, different by a few hundredths of a millimeter from its position when proceeding with the adjustment.

(c) Any metal particle which may be carried along intermediate the slide and the associated contacting surfaces is necessarily crushed upon the locking being effected so that such surfaces are damaged by said particle.

It is an object of the present invention to provide a new or improved device for locking and unlocking machine slides, particularly machine tool slides with respect to their carriers, such device being specially devised to obviate the aforesaid disadvantages.

Another object of the invention is to provide a device for locking and unlocking machine tool slides enabling proper lubrication of the slide and carrier surfaces to take place irrespective of their mutual positions during the locking and unlocking operations owing to the provision of specially mounted friction clamping means.

A further object of the invention is to provide a device as aforesaid comprising friction linings, the latter being so arranged that any metal particles which may be carried along can bite into said linings, thereby avoiding damage to adjacent metal surfaces on the contiguous slide and carrier, while allowing of an automatic compensation of any slight unevenness which may occur on such surfaces.

A still further object of the invention is to provide a device as aforesaid enabling any position assumed by a slide in locked condition to remain identical with its position at the time when it was adjusted to proper setting.

With these and such other objects in view as will incidentally appear hereafter, the invention comprises the novel construction and combination of parts that will now be described with reference to the accompanying drawings exemplifying the same and forming a part of the present disclosure.

In the drawings:

Figure 3 is an exploded view in perspective showing the mechanism used for actuating the locking members.

Figure 4 shows a modification of the locking member.

Figure 5 is a diagrammatic end elevational view of the slides of a machine carriage, the said slides being fitted with a locking device according to the invention, this view showing how the position of the carriage and the continuity of the oil film are maintained.

Figure 6 is a plan view of the device shown in Fig. 5.

Figure 7 is a diagrammatic end elevational view showing the conventional machine carriage slides fitted with known locking means and also showing the change of position of the locked carriage and the interruption of the oil film.

Figure 1:
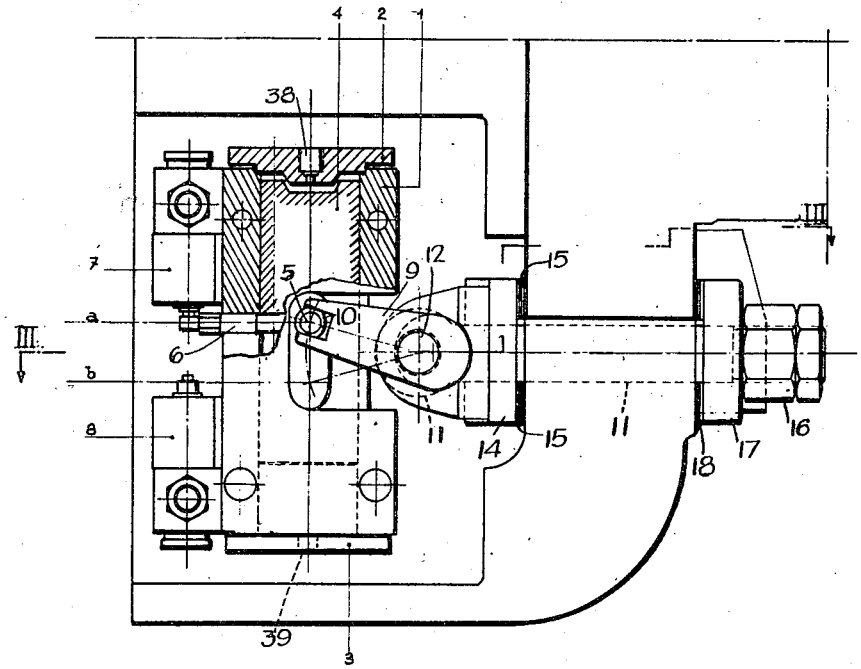
Figure 1 shows an example of arranging the locking unit on a machine slide adapted for guiding the machine carriage, the showing being mostly in elevation with certain parts shown in section.

The device shown in detail in Fig. 1 comprises a cylinder body 1 closed by cylinder heads 2 and 3. In this cylinder is housed for sliding motion a double acting piston 4 which may be either ground to accurate size or fitted with piston rings. The piston 4 carries in its central portion a pin 5 held in proper position by a screw 6 which also acts as a stroke indicator. The cylindrical end portion of the screw head may trip into action, when occupying its *a* or its *b* position, two contacts 7 and 8 for controlling in any suitable manner the fluid supplied to the respective ends of the cylinder 1 to move the piston therein. To this end openings 38, 39 may be provided in the respective cylinder heads 2 and 3.

The piston pin 5 drives through the medium of a sliding block 10 a pair of links 9 each of which is provided with an eccentric. Such links are connected to the eye of a bolt 11 by means of a stud 12. The eccentrics of the links 9 have mounted thereon side plates 13 at either side of the eye of the bolt 11 (see also Figure 3), which plates are abutted on a shoe 14 fitted with a riveted or otherwise bonded friction lining 15.

The bolt nut 16 is held in position by a lock nut or other safety contrivance such as a cotter, locking washer or the like. This nut 16 is abutted to a shoe 17 fitted with a riveted or otherwise bonded friction lining 18.

When fluid under pressure is delivered to the respective ends of the cylinder 1 it produces movement of the piston and angular movement of the links 9 and their eccentrics, thereby producing tractional stress on the bolts 11. Upward movement of piston produces locking action and clamping of the two machine tool members against movement relative to each other.

Unlocking is obtained by reverse motions.

As the locking position corresponds with a non-overhauling position of the eccentric, the fluid pressure is necessary only during the very short time which is used for reaching said position. Therefore leakages which may cause a complete drop of pressure cannot bring about unlocking.

Figure 2:
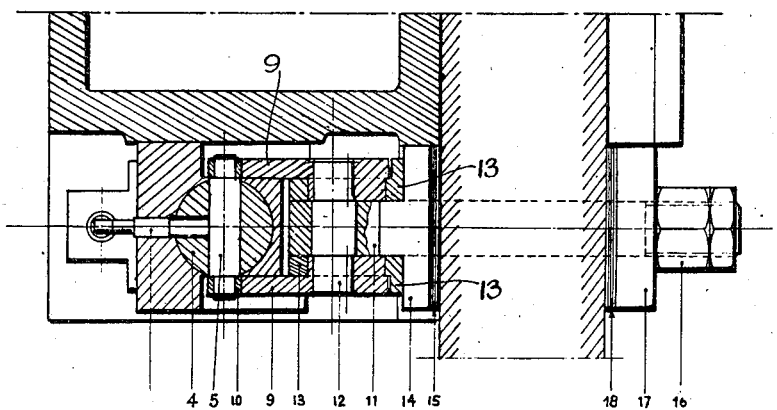
Figure 2 shows the same arrangement in horizontal sectional view taken on the line III—III of Figure 1.

In the modified construction of the locking member which is represented in Fig. 4, this member comprises a lever 30 which may be carried upon the eccentric as is the plate 13 of Figs. 2, 3 and 7 pivoted to the eye bolt 11 by stud 12, said lever being connected to a pair of shoes 31 pivoted on axes 32. A similar device as regards the pivoted shoes is arranged under the nut 16. In this manner, considerable differences in level between the slide 33 and stationary portion 34 may be taken up.

The adjustment of the space between shoes may be accurately effected and the amount of such an adjustment may be easily controlled.

The following steps are taken to that end:

1.—The links 9 of the device are brought to locking position, as shown in Figure 1;

2.—The nuts 16 of the finely screw-threaded eye bolt 11 are tightened;

3.—A manometer may be tapped on the pipe leading to the pressure side of the piston 4.

As the links 9 start toward the unlocking position, a test is made to ascertain that pressure prevailing in the system at the moment of such starting is equal to a predetermined pressure. Should it be found to be lower, the nuts should be tightened. Where, on the contrary, the links 9 do not start to assume unlocking position, a test is made to ascertain whether or not the pressure becomes excessive. If so the nuts are loosened.

By repeated trials, the prescribed pressure value and consequently the required locking effect are thus obtained.

It will be seen, particularly by comparing the diagrammatic showings of Figs. 5 and 7 which respectively illustrate the slides of a machine tool with and without the present invention being applied thereto, that:

(a) The oil film 35 between the stationary part 34 and the slide 33 is preserved, even after the locking action (while in the usual arrangement this oil film vanishes along the contact surface 36, Fig. 7) thereby preventing any risk of non-lubricated operation and any waste of time (pending the reconstitution of the oil film) when the slide 33 is again put into action.

(b) The position assumed by the locked slide remains positively identical with its position at the time of the adjustment inasmuch as, owing to the construction of the present device and its setting, the pressure is equally exerted on both faces of the slide (such pressures being indicated by the arrows in Fig. 5 and mutually counterbalanced) whereas in the usual arrangement (see Fig. 7) a slight shift of the slide 33 towards the left relative to the stationary part 34 takes place when locking is effected as can be seen on this figure.

(c) Where a metal particle is driven between the slide 33 and frame 34, it bites into the linings 15 or 18, Figs. 1, 2, and does not damage the contacting surfaces.

(d) These semi-rigid linings enable slight level discrepancies between locking surfaces on the slide and frame to be compensated, an advantage which is still further reinforced where the arrangement shown in Fig. 4 is adopted.

In the foregoing, an embodiment of the invention has been described comprising a hydraulically controlled locking device. However, it should be understood that while such an embodiment is preferable, the control might be mechanical or entirely electrical, the transmission system between the controlled member (the control being derived from the links 9) and the shoes 14, 17 remaining unchanged. Such control, however, might be an equivalent arrangement, for example a cam arrangement instead of the eccentric associated with each link 9.

The invention is applicable not only to machine tools but to any other type of machine comprising a slide capable of gliding on a stationary part of the machine and requiring to be accurately locked in desired positions.

The above-described device as shown in the drawings has been disclosed merely by way of example and might receive certain modifications so far as its constructional details are concerned without changing the general scope of the invention.

What is claimed is:

1. In a machine tool or the like having two members movable relative to each other, one of said members providing a slideway surface and the other being movable along and having a surface in sliding contact with said slideway surface, in combination, a part carried by each of said members and providing for its member a pair of oppositely positioned parallel friction faces extending parallel to the direction of movement of said movable member along said slideway surface, a pair of friction shoes arranged respectively adjacent and for contact with the respective oppositely positioned parallel friction faces of both said parts of said members, and means operatively connected to said shoes and operable to force said shoes into substantially simultaneous gripping contact with said oppositely positioned parallel friction faces on both of said parts so as to produce opposed pressures respectively thereon which prevent movement of said members relative to each other transversely as well as along said slideway surface.

2. In a machine tool or the like, the combination as defined in claim 1 comprising a pressure confining cylinder, a piston operable in said cylinder upon introduction of a fluid under pressure into said cylinder, camming means supported for rotative movement on an axis, means operatively connecting said piston to said camming means to effect rotative movement thereof upon operation of said piston in said cylinder, and means providing a cam follower engaged by said camming means and operatively connected to said friction shoes for producing movement of said shoes into and out of gripping contact with said friction faces upon operation of said piston.

3. In a machine tool or the like, the combination as defined in claim 6, said clamping elements comprising linings of yieldable material for contact with said faces of said parts of said members.

4. In a machine tool or the like, the combination as defined in claim 6, said adjacent faces being respectively substantially in the same plane in the two members.

5. In a machine tool or the like, the combination as defined in claim 6, each element being provided with two contact portions respectively for contact with the faces of said two parts, said portions each being pivotally supported in its element, whereby the pressure of said elements on said faces is equalized.

6. In a machine tool or the like having two members movable relative to each other, one of said members providing a slideway surface and the other being movable along and having a surface in sliding contact with said slideway surface, in combination, a part rigidly connected to one of said members and providing two parallel oppositely disposed faces extending generally parallel to the direction of movement of said members relative to each other, a part rigidly connected to the other member and providing two parallel oppositely disposed faces also extending generally parallel to the direction of movement of said members relative to each other and respectively adjacent said parallel faces of said first part, a pair of clamping elements supported for movement toward and away from each other and so that each element engages both said parts, one of said clamping elements having a contact surface adapted to bear against a given face of one of said parts and a contact surface adapted to bear against the adjacent face of the other part, the other clamping element having contact surfaces respectively adapted to bear against the other faces of said parts which respectively are parallel to and opposite to said given face and to said adjacent face, and means for urging said two clamping elements toward each other so as to engage the respective contact surfaces thereof with the respective oppositely disposed parallel faces of said parts to effect clamping of said members against movement relative to each other along said sliding surfaces without producing substantial movement of said members with respect to each other transversely of the sliding surfaces.

CHARLES WILLIAM BERTHIEZ.

REFERENCES CITED

The following references are of record in the file of this patent:

UNITED STATES PATENTS

| Number | Name | Date |
|---|---|---|
| 623,322 | Lavigne | Apr. 18, 1899 |
| 1,533,165 | Cross | Apr. 14, 1925 |
| 1,748,348 | Hyatt | Feb. 25, 1930 |
| 1,881,675 | Klausmeyer et al. | Oct. 11, 1932 |
| 1,981,263 | Croft | Nov. 20, 1934 |
| 2,224,108 | Ridgway | Dec. 3, 1940 |
| 2,251,016 | Gallimore | July 29, 1941 |
| 2,326,371 | Le Tourneau | Aug. 10, 1943 |